US012090765B2

(12) United States Patent
Maruyama

(10) Patent No.: US 12,090,765 B2
(45) Date of Patent: Sep. 17, 2024

(54) INK JET PRINTING APPARATUS, INK TANK AND INK SUPPLY CONTAINER

(71) Applicant: CANON KABUSHIKI KAISHA, Tokyo (JP)

(72) Inventor: Taiji Maruyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/315,424

(22) Filed: May 10, 2023

(65) Prior Publication Data

US 2023/0278345 A1 Sep. 7, 2023

Related U.S. Application Data

(63) Continuation of application No. 17/081,892, filed on Oct. 27, 2020, now Pat. No. 11,673,405.

(30) Foreign Application Priority Data

Oct. 31, 2019 (JP) ................................ 2019-198685

(51) Int. Cl.
*B41J 2/175* (2006.01)

(52) U.S. Cl.
CPC ....... *B41J 2/17596* (2013.01); *B41J 2/17506* (2013.01); *B41J 2/17509* (2013.01); *B41J 2/17513* (2013.01); *B41J 2/17523* (2013.01)

(58) Field of Classification Search
CPC .... B41J 2/175; B41J 2/17503; B41J 2/17506; B41J 2/17509; B41J 2/17513; B41J 2/17523; B41J 2/1754; B41J 2/17553; B41J 2/17566; B41J 2/17596; B41J 29/02; B41J 29/13; B41J 2002/17573
See application file for complete search history.

(56) References Cited

U.S. PATENT DOCUMENTS 10,618,292 B2 * 4/2020 Fukasawa ............ B41J 2/17523
11,673,405 B2 * 6/2023 Maruyama ........... B41J 2/17596 347/85
2010/0201761 A1 * 8/2010 Lu ........................ B41J 2/17509 347/86

* cited by examiner

*Primary Examiner* — Anh T Vo
(74) *Attorney, Agent, or Firm* — Canon U.S.A., Inc. I.P. Division

(57) ABSTRACT

A printing apparatus includes an ink tank and a flow channel member. The tank includes an ink chamber that stores ink, an injection port through which the ink is injected into the chamber, and a first shape portion formed near the injection port. The flow channel member is configured to be disposed inside the injection port and form a channel through which the ink is injected into the chamber. The ink is injected to the chamber from an ink supply container which includes a second shape portion formed near an outlet port of the container and configured to engage the first shape portion. The flow channel member is displaceable in a direction intersecting an inserting direction of inserting the outlet port into the injection port. The container is fixed to the tank by engagement between the first and second shape portions.

18 Claims, 10 Drawing Sheets

INK JET PRINTING APPARATUS, INK TANK AND INK SUPPLY CONTAINER

CROSS-REFERENCE TO RELATED APPLICATIONS

This application is a continuation of U.S. application Ser. No. 17/081,892, filed Oct. 27, 2020, which claims the benefit of Japanese Patent Application No. 2019-198685, filed Oct. 31, 2019, each of which is hereby incorporated by reference herein in their entirety.

BACKGROUND OF THE INVENTION

Field of the Invention

The present disclosure relates to an ink jet printing apparatus that prints an image by ejecting ink and also to an ink tank.

Description of the Related Art

Japanese Patent Laid-Open No. 2018-140556 discloses an ink supply container and an ink tank. Ink is supplied from the ink supply container to the ink tank through multiple flow channels inserted into the inside the ink tank through an opening thereof. The flow channels serve as flow paths for ink and for air and enable gas-liquid exchange between the ink supply container and the ink tank during ink replenishment. Thus, a user can supply ink from the ink supply container to the ink tank without squashing the ink supply container.

In this system, a gap is provided between a needle disposed in the ink tank and an outlet port of the ink supply container to facilitate alignment between the ink supply container and the ink tank and also to facilitate insertion of the needle into the outlet port. In this configuration disclosed in Japanese Patent Laid-Open No. 2018-140556, however, the ink supply container may not be fixed securely to the ink tank and may become unstable during ink injection for replenishment due to the gap being provided between the needle of the ink tank and the outlet port.

SUMMARY OF THE INVENTION

The present disclosure provides a technique that enables reliable ink injection operation.

According to an aspect of the present disclosure, there is provided an ink jet printing apparatus, comprising: an ink tank including: an ink chamber that stores ink to be supplied to a printhead configured to eject the ink; an injection port through which the ink is injected into the ink chamber; and a first shape portion formed near the injection port; and a flow channel member configured to be disposed inside the injection port and form a channel through which the ink is injected into the ink chamber; wherein the ink is injected to the ink chamber from an ink supply container which includes: an outlet port configured to be inserted into the injection port and configured for the ink to flow through; and a second shape portion formed near the outlet port and configured to engage the first shape portion, the flow channel member is displaceable in a direction intersecting an inserting direction of inserting the outlet port into the injection port, and the ink supply container is fixed to the ink tank by engagement between the second shape portion and the first shape portion.

Further features of the present disclosure will become apparent from the following description of exemplary embodiments with reference to the attached drawings.

DESCRIPTION OF THE EMBODIMENTS

First Embodiment

Embodiments of the present disclosure will be described with reference to the drawings. The embodiments described herein are not intended to limit the present disclosure. All of the combinations of the features described in the embodiments are not necessarily essential to the present disclosure. Shapes, relative dispositions, or the like of the elements described in the embodiments are merely examples, and the scope of the present invention is not limited to such examples.

Apparatus Configuration

Figure 1A:
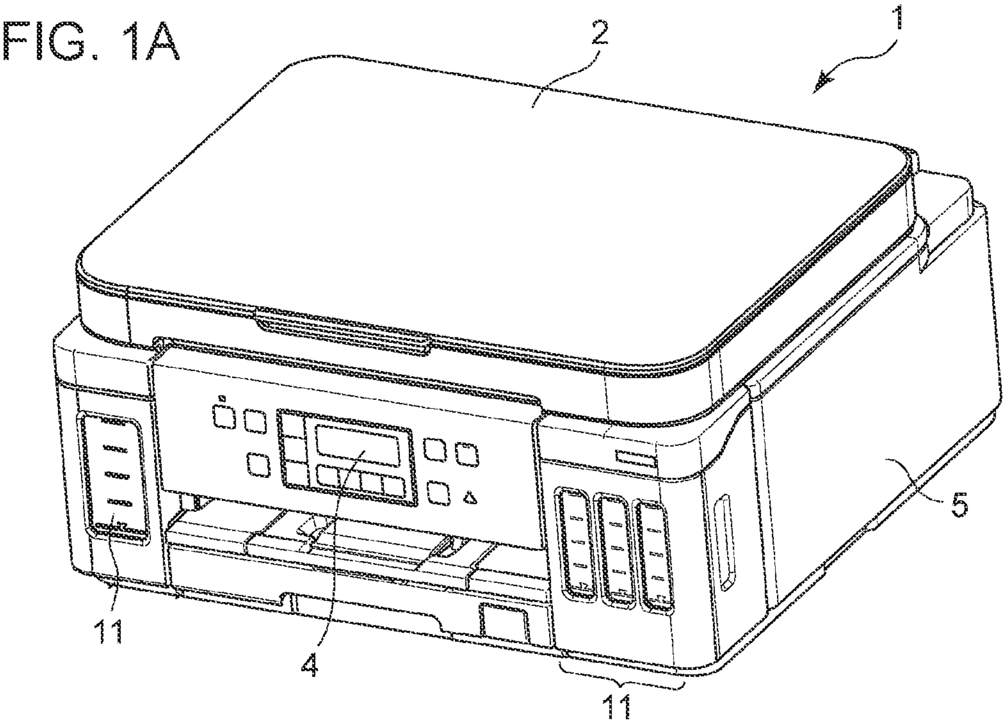
FIG. 1A and FIG. 1B are perspective views illustrating an external appearance of an ink jet printing apparatus according to a first embodiment.

FIG. 1A is a perspective view illustrating an external appearance of an ink jet printing apparatus 1 (hereinafter referred to as "printing apparatus 1") according to the present embodiment. The printing apparatus 1 includes a housing 5, a printhead 3 (see FIG. 2) for performing printing on a print medium, and ink tanks 11 that serve as ink containers for storing respective inks to be supplied to the printhead 3. The ink tanks 11 of the present embodiment are disposed at the front side of the housing 5 and fixed to a main body of the apparatus. An operation unit 4 is also disposed at the front side of the housing 5. The operation unit is configured for a user to input instructions or the like to operate the printing apparatus 1. The operation unit 4 of the present embodiment includes a display panel configured to display error messages of the printing apparatus 1.

Figure 1B:
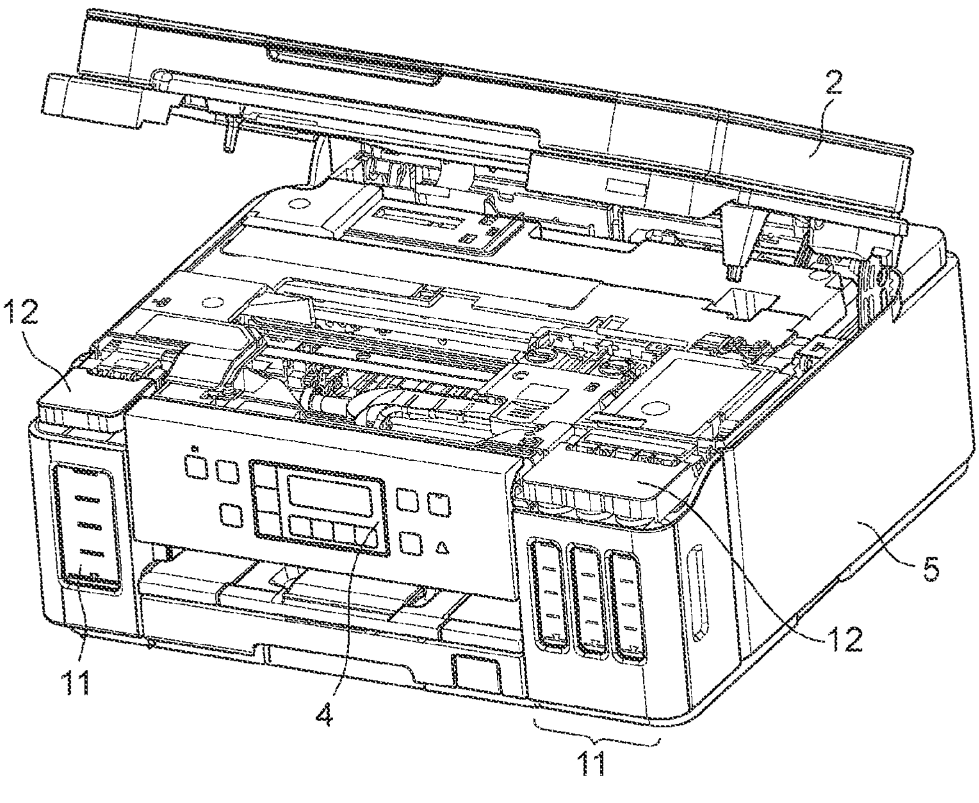

A scanner unit 2 for scanning documents is disposed at the top of the housing 5 so as to be openable with respect to the housing 5. FIG. 1B is a perspective view illustrating an external appearance of the printing apparatus 1 when the scanner unit 2 is open with respect to the housing 5. When the scanner unit 2 is open, tank covers 12 configured to cover top surfaces of the ink tanks 11 are exposed. In FIG. 1B, the tank covers 12 are closed. Note that the printing apparatus 1 not including the scanner unit 2 may have a main cover that is openable with respect to the housing 5.

Figure 2:
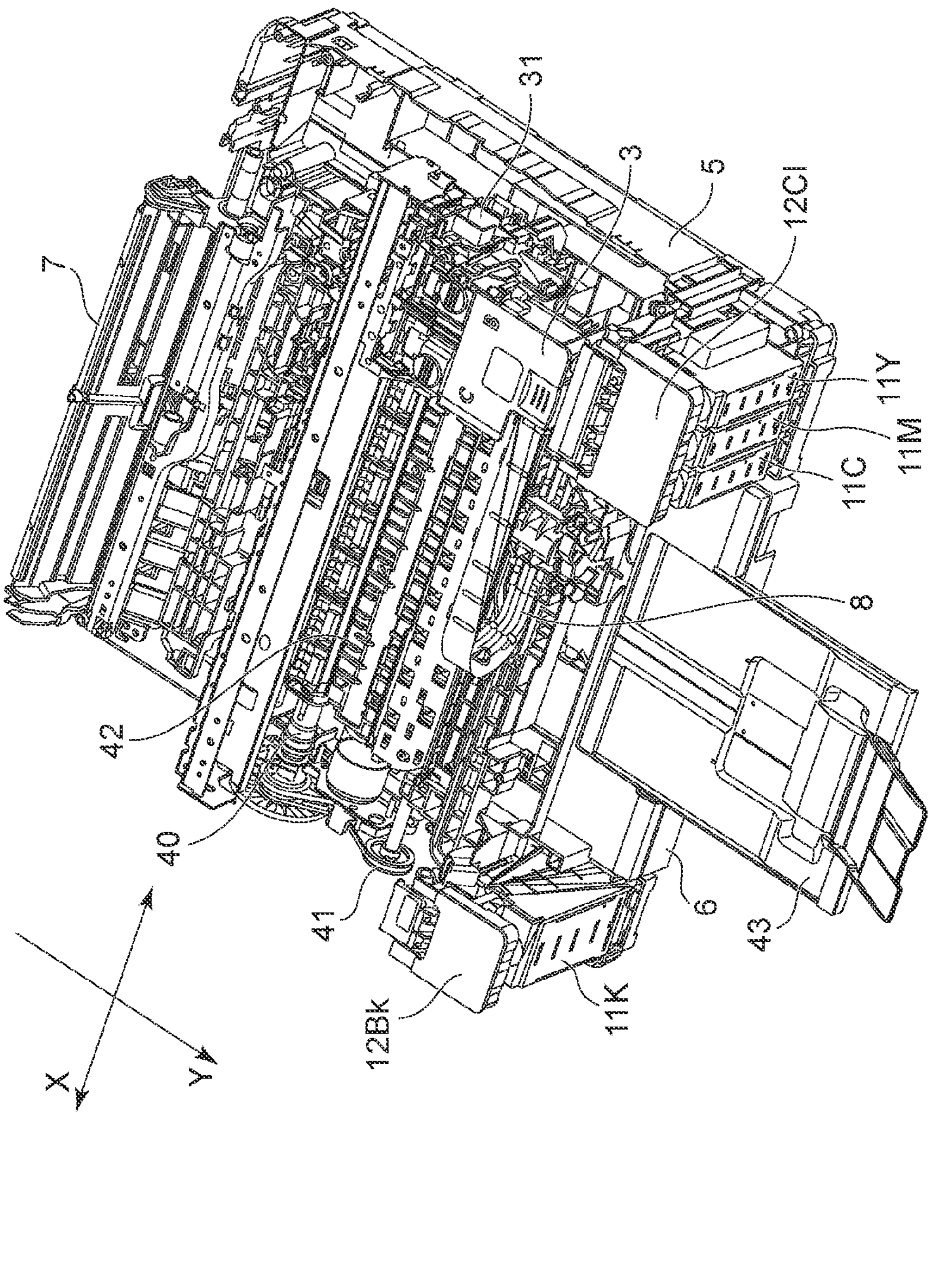
FIG. 2 is a perspective view illustrating an internal configuration of the ink jet printing apparatus according to the first embodiment.

FIG. 2 is a perspective view illustrating an internal configuration of the printing apparatus 1. In the printing apparatus 1, a feeder unit (not illustrated) feeds print media stored in a sheet feeding cassette 6 disposed at the front side of the housing 5 or stored in a sheet feeding tray 7 disposed at the rear side of the housing 5. A print medium fed by the feeder unit is conveyed by a conveyance roller 40 (conveyance unit 40) onto a platen 42 disposed so as to oppose the printhead 3. The platen 42 is a member to guide and support the print medium onto which the printhead 3 performs printing.

The print medium on which the printhead 3 has performed printing is discharged onto a sheet discharge tray 43 by a discharge roller 41 (discharge unit 41). The sheet discharge tray 43 is disposed above the sheet feeding cassette 6.

Note that the direction in which the print medium is conveyed by the conveyance roller 40 (i.e., Y direction in FIG. 2) is referred to as the "conveyance direction". In other words, an upstream side in the conveyance direction is located near the rear side of the housing 5, and a downstream side in the conveyance direction is located near the front side of the housing 5.

The printhead 3 is mounted in a carriage 31, which reciprocally moves in a main scanning direction (i.e., X direction in FIG. 2) that intersects the conveyance direction. In the present embodiment, the conveyance direction and the main scanning direction orthogonally intersect each other. While the printhead 3 moves together with the carriage 31 in the main scanning direction, the printhead 3 prints a one-pass portion of an image onto the print medium by ejecting ink droplets (printing operation). After the one-pass portion of the image is printed, the print medium is conveyed by the conveyance roller 40 by a predetermined amount in the conveyance direction (intermittent conveyance operation). An image based on image data is printed on the entire print medium by repeating the one-pass printing operation and the intermittent conveyance operation.

Among various ink jet printing methods, a process of using thermal energy for ejecting ink is adopted in the printhead 3. The printhead 3 includes elements (for example, heat elements) that generate thermal energy, and the thermal energy causes the ink to change its state (film boiling) for ejection. This enables high-density and high-resolution image printing. Note that the present disclosure may be applied not only to the printing process using thermal energy but also to a printing process using vibrational energy generated by piezoelectric elements.

A maintenance unit is provided in the printing apparatus 1 at a position inside the scanning region of the carriage 31 and outside the printing region in which the printhead 3 performs printing. The maintenance unit, which is a unit for performing maintenance of the printhead 3 to maintain ejection performance, is disposed so as to oppose an ejection orifice surface of the printhead 3 on which ejection orifices for ejecting ink are arrayed.

In FIG. 2, the printhead 3 is located at a home position at which the maintenance unit can perform maintenance operation. For example, the maintenance unit includes a cap configured to cap the ejection orifice surface and a suction recovery mechanism for suction operation. In the suction operation, the suction recovery mechanism forcibly sucks ink from the ejection orifices to remove remaining bubbles and viscous ink while the ejection orifice surface is capped.

Note that in the present embodiment, a serial head in which the printhead 3 is mounted in the carriage 31 is described by way of example. The present disclosure, however, is not limited to this but may be applied to a line head in which ejection orifices are arrayed so as to cover a region that corresponds to the width of the print medium.

The ink tanks 11 of respective color inks to be ejected from the printhead 3 are provided in the printing apparatus 1. In the present embodiment, the printing apparatus 1 has four ink tanks 11, in other words, an ink tank 11K for black ink, an ink tank 11C for cyan ink, an ink tank 11M for magenta ink, and an ink tank 11Y for yellow ink, which are collectively referred to as the "ink tanks 11". Note that cyan, magenta, yellow are merely examples of color inks, and other color inks may be used.

As illustrated in FIG. 2, the ink tank 11K for black is disposed to the left of the sheet discharge tray 43 and the sheet feeding cassette 6 as viewed from in front of the printing apparatus 1. The ink tank 11C for cyan, the ink tank 11M for magenta, and the ink tank 11Y for yellow are disposed to the right of the sheet discharge tray 43 and the sheet feeding cassette 6 as viewed from in front of the printing apparatus 1. In other words, the sheet discharge tray 43 and the sheet feeding cassette 6 are disposed between the ink tank 11K for black and the ink tanks for color inks. Each ink tank 11 is connected to the printhead 3 by a flexible supply tube 8 that constitutes part of a supply channel for supplying the ink to the printhead 3.

The printing apparatus 1 has a tank cover 12Bk for black and a tank cover 12Cl for color inks. The tank cover 12Bk for black covers the top surface of the ink tank 11K for black. The tank cover 12Cl for color inks covers all of the top surfaces of the ink tank 11C for cyan, the ink tank 11M for magenta, and the ink tank 11Y for yellow. The tank cover 12Bk for black and the tank cover 12Cl for color inks are hereinafter collectively referred to as "tank covers 12".

Ink Injection

FIGS. 3A to 3D are perspective views illustrating an external appearance of a tank unit 10 that includes an ink tank 11 and a peripheral structure. Since the basic structure of each tank unit 10 is similar, the tank unit 10 for black will be described below as a representative example.

Figure 3A:
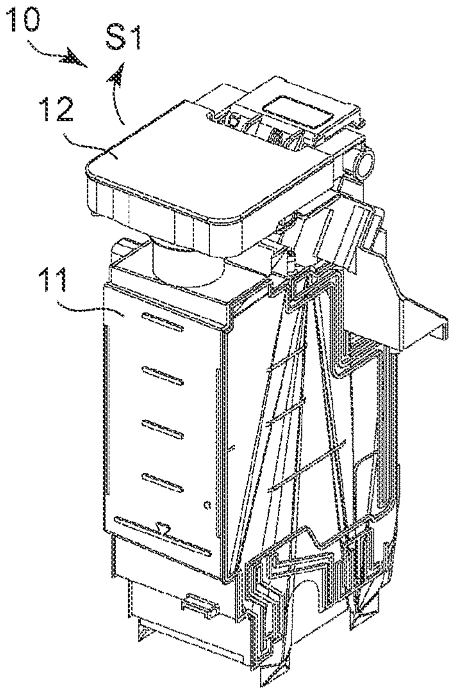
FIGS. 3A to 3D are perspective views illustrating an external appearance of a tank unit according to the first embodiment.
Figure 3B:
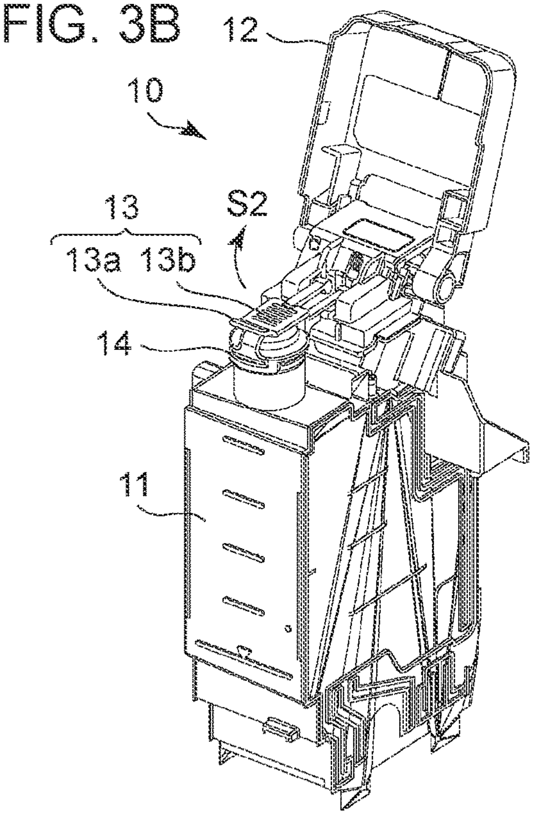

FIG. 3A illustrates a state in which a tank cover 12 is closed, and FIG. 3B illustrates a state in which the tank cover 12 is open. A user opens the tank cover 12 in the S1 direction to access the tank cap 13.

An injection port 14 for ink injection is formed at the top surface of the ink tank 11, and a tank cap 13 is configured to seal the injection port 14. The tank cap 13 includes a cap member 13*a* for sealing the injection port 14 and a lever member 13*b* that supports the cap member 13*a*. The lever member 13*b* is turnably fixed to the main body of the printing apparatus 1. A user can handle the lever member 13*b*.

Figure 3C:
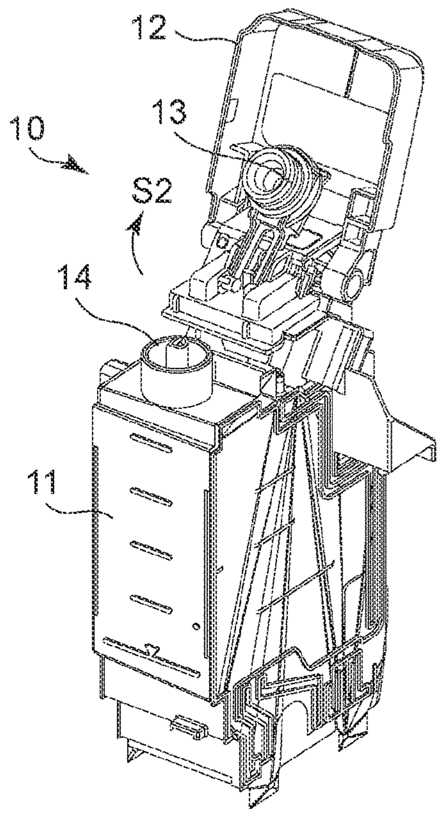

A user detaches the cap member 13*a* from the injection port 14 by turning the lever member 13*b* in the S2 direction in FIG. 3B to enable ink injection (see FIG. 3C). Note that the lever member 13*b* may be turnably fixed to the ink tank 11 or to the tank cover 12.

The cap member 13*a* of the tank cap 13 is formed of a member having rubber elasticity, and the lever member 13*b* is formed of a plastic member or the like. According to the present embodiment, lever members 13*b* are colored so as to correspond to respective colors of inks stored in the ink tanks 11.

In other words, the lever member 13*b* for black ink is colored black or gray, the lever member 13*b* for cyan ink is colored cyan, the lever member 13*b* for magenta ink is colored magenta, and the lever member 13*b* for yellow ink is colored yellow. This can reduce the likelihood of a user injecting a wrong ink when the user injects inks into respective ink tanks 11. Note that not only the lever members 13*b* but also the cap members 13*a* may be colored accordingly.

Figure 3D:
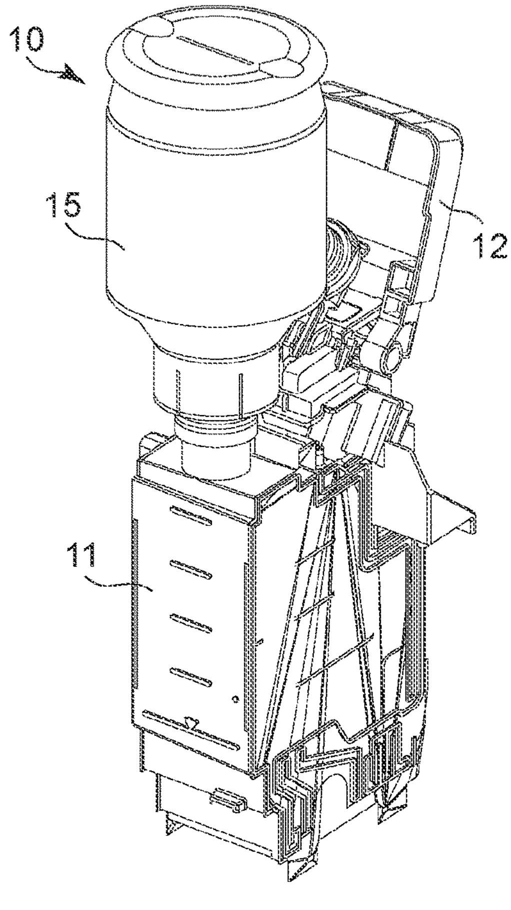

FIG. 3D illustrates a state in which a user inserts an ink bottle 15, which serves as an ink supply container, into the injection port 14 and injects an ink when the tank cap 13 is detached. In the present embodiment, the ink in the ink bottle 15 is injected into the ink tank 11 while gas-liquid exchange between the ink in the ink bottle 15 and the air in the ink tank 11 occurs.

Configuration of Ink Tank

Figure 4A:
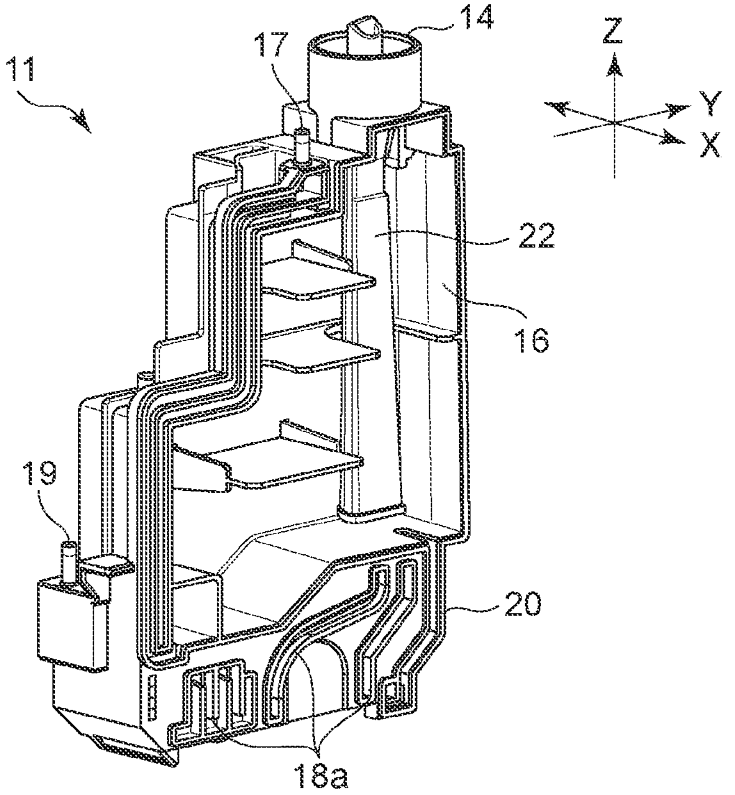
FIG. 4A and FIG. 4B are perspective views illustrating an ink tank according to the first embodiment.
Figure 4B:
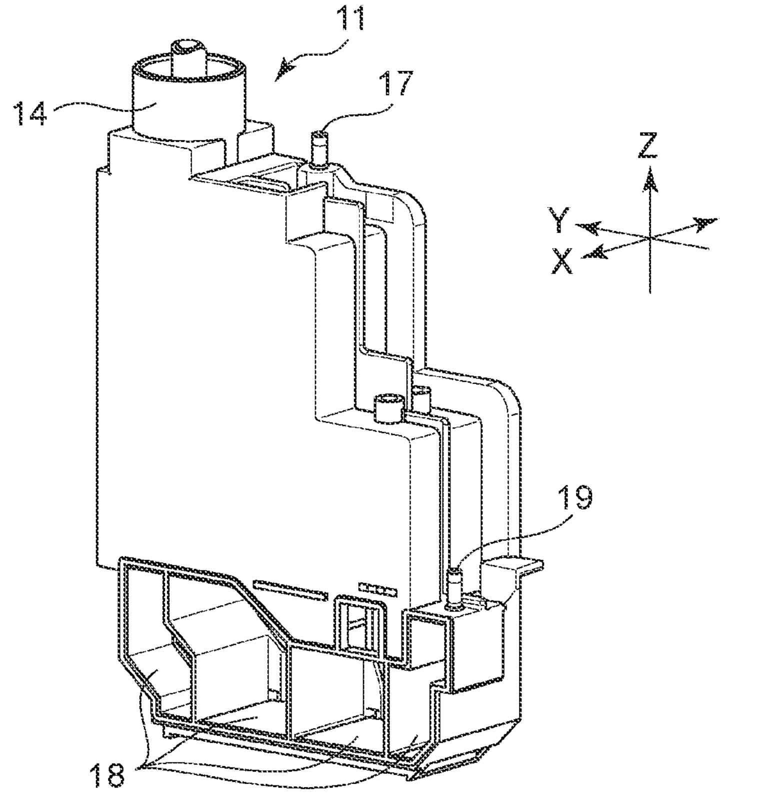

FIG. 4A and FIG. 4B are perspective views illustrating the ink tank 11. The ink tank 11 includes an ink chamber 16 for storing ink, an ink supply port 17 for supplying the ink from the ink chamber 16 to the printhead 3, an air chamber 18 for storing air, and an atmospheric communication port 19 for enabling the air chamber 18 to communicate with the atmosphere. The ink chamber 16 is disposed in an upper portion of the ink tank 11. In FIG. 4A, the ink chamber 16 opens at a first side of the ink tank 11.

FIG. 4A is a perspective view illustrating the ink tank 11 when the first side of the ink tank 11 is viewed. One end of the ink supply port 17 is connected to the ink chamber 16, and the other end of the ink supply port 17 is connected to the supply tube 8. The opening of the ink chamber 16 at the first side of the ink tank 11 is closed by a film (not illustrated). The air chamber 18 is disposed under the ink chamber 16. In FIG. 4B, the air chamber 18 opens at a second side of the ink tank 11, which is opposite to the first side.

FIG. 4B is a perspective view illustrating the ink tank 11 when the second side of the ink tank 11 is viewed. The air chamber 18 and the ink chamber 16 are connected to each other by a connection channel 20 that extends downward from the bottom of the ink chamber 16. The bottom end of the connection channel 20 serves as a gas-liquid exchange region for air and ink. The gas-liquid exchange region has such a cross-sectional area as to be able to maintain a meniscus of ink. The air chamber 18 is also connected to the atmospheric communication port 19 for communication with the atmosphere.

In normal operation, ink is supplied from the ink chamber 16 to the printhead 3 as the printhead 3 ejects ink. Meanwhile, a volume of air equal to the volume of ink supplied to the printhead 3 is supplied from the air chamber 18 to the ink chamber 16 via the gas-liquid exchange region.

If the air in the ink chamber 16 expands due to fluctuation in temperature or atmospheric pressure or the like and the meniscus at the gas-liquid exchange region is thereby broken, the ink in the ink chamber 16 drops into the air chamber 18 due to head difference. Accordingly, the air chamber 18 has such a volume as to be able to accommodate a full amount of ink that can be stored in the ink chamber 16. Thus, the air chamber 18 also serves as a buffer chamber that prevents ink from spilling from the atmospheric communication port 19 into the printing apparatus.

Ink Supply

Figure 5A:
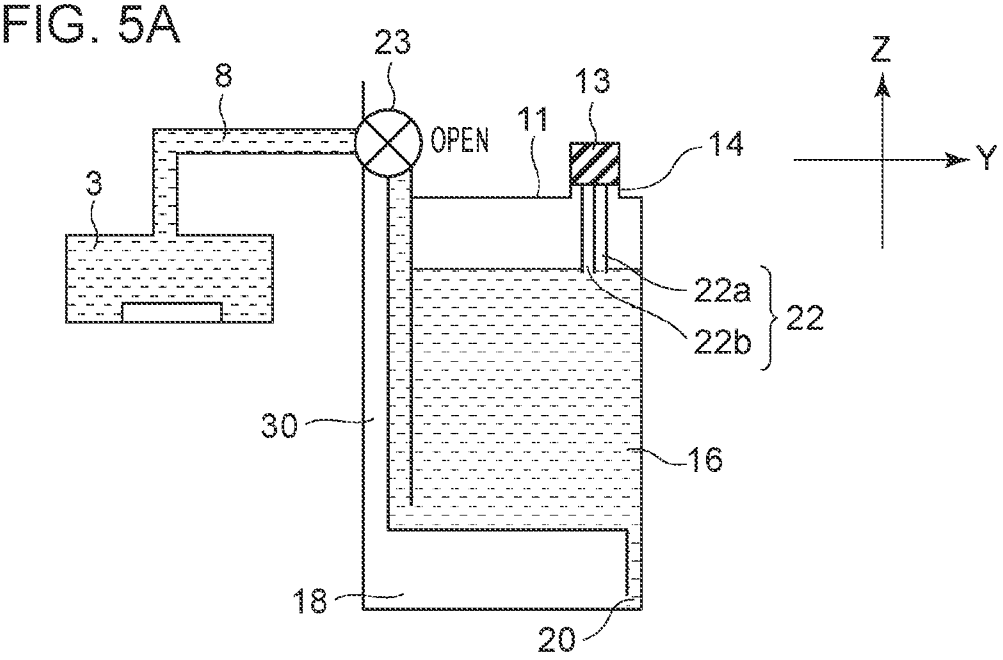
FIG. 5A and FIG. 5B are diagrams illustrating an ink supply path to a printhead from the ink tank according to the first embodiment.
Figure 5B:
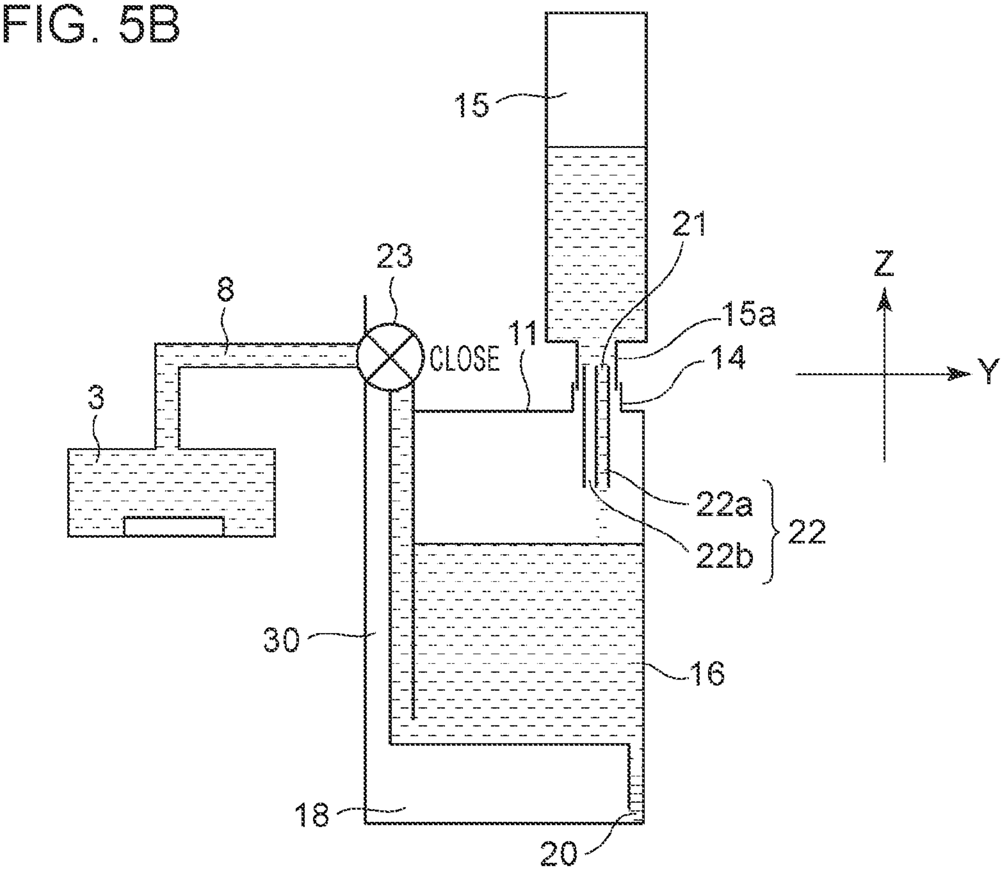

FIG. 5A and FIG. 5B are diagrams illustrating an ink supply path from the ink tank 11 to the printhead 3. In FIGS. 5A and 5B, part of the detailed structure of the ink tank 11 is omitted. FIG. 5A illustrates the ink supply path during printing operation, whereas FIG. 5B illustrates the ink supply path when a user injects ink.

In the ink tank 11 illustrated in FIGS. 5A and 5B, the supply tube 8 is connected to the ink supply port 17 illustrated in FIGS. 4A and 4B, and the supply tube 8 connects the ink chamber 16 to the printhead 3. In addition, in the ink tank 11 illustrated in FIGS. 5A and 5B, an atmospheric communication tube 30 for communication with the atmosphere is connected to the atmospheric communication port 19 illustrated in FIGS. 4A and 4B, and the air chamber 18 is open to the atmosphere through the atmospheric communication tube 30. The supply tube 8 and the atmospheric communication tube 30 can be opened or closed simultaneously by a valve 23.

In the present embodiment, the opening and closing of the valve 23 are linked to user's opening and closing of the corresponding tank cover 12. In other words, when the tank cover 12 is closed, the valve 23 opens the supply tube 8 and the atmospheric communication tube 30. On the other hand, when the tank cover 12 is opened, the valve 23 closes the supply tube 8 and the atmospheric communication tube 30. Note that the valve 23 may be opened or closed by a member other than the tank cover 12. Moreover, the supply tube 8 and the atmospheric communication tube 30 may have separate valves 23.

As illustrated in FIG. 5A, during printing operation, an amount of ink equal to an amount ejected from the printhead 3 is continuously supplied from the ink chamber 16 to the printhead 3 through the supply tube 8. During printing operation, the injection port 14 is sealed by the cap 13. A volume of air equal to the volume of ink ejected from the printhead 3 is supplied from the air chamber 18 to the ink chamber 16 through the connection channel 20. In other words, the gas-liquid exchange between ink and air occurs in the connection channel 20 at a liquid surface near the air chamber 18.

The ink tank 11 also includes a needle 22 disposed inside the injection port 14. The needle 22 serves as a flow channel member (injection support member) for facilitating ink injection through the injection port 14. The needle 22 is formed of a first channel 22*a* and a second channel 22*b* that enable the inside and the outside of the ink tank 11 to communicate with each other. Note that the needle 22 is made of a material different from that of the ink tank 11.

In FIG. 5B, the first channel 22*a* of the needle 22 functions as a flow channel through which ink flows from the ink bottle 15 toward the ink chamber 16, whereas the second channel 22*b* functions as another flow channel through which air flows from the ink chamber 16 to the ink bottle 15. Note that both of the first channel 22*a* and the second channel 22*b* can function as channels for ink and for air. When ink first flows from the ink bottle 15 through one channel, the channel functions as the channel for ink and the other channel functions as the channel for air.

When a user injects ink into an ink tank 11, the user first open the tank cover 12 (see FIG. 3) to expose the cap 13. When the tank cover 12 is opened, the valve 23 closes the supply tube 8 and the atmospheric communication tube 30. In other words, the ink supply from the ink tank 11 to the printhead 3 is cut off, and the communication between the ink tank 11 and the atmosphere is also cut off. Closing the valve 23 reduces the likelihood of ink being spilled from the ejection orifice surface of the printhead 3 and from the atmospheric communication tube 30 during ink injection.

Next, the user detaches the cap 13 from the injection port 14 to expose the injection port 14 and the needle 22. The user subsequently inserts (mounts) the ink bottle 15 in the injection port 14 in such a manner as to insert the needle 22 into an outlet port 15*a* of the ink bottle 15.

When the needle 22 is inserted into the outlet port 15*a*, a valve (not illustrated) disposed inside the ink bottle 15 is opened, thereby causing the inside of the ink bottle 15 to communicate with the inside of the ink tank 11. Gas-liquid exchange between the ink in the ink bottle 15 and the air in the ink chamber 16 occurs while the first channel 22*a* and the second channel 22*b* of the needle 22 function as channels for air and ink, which enables ink to be injected into the ink tank 11.

As ink injection progresses, the surface of the ink in the ink chamber 16 reaches the bottom end of the needle 22 (especially to the bottom end of the second channel 22*b* functioning as the air channel). As a result, air cannot flow out of the ink chamber 16, and the gas-liquid exchange stops. This stops ink flow from the ink bottle 15 to the ink chamber 16, and the ink injection is completed. In the present embodiment, as described above, ink injection is performed while the gas-liquid exchange occurs.

Figure 6:
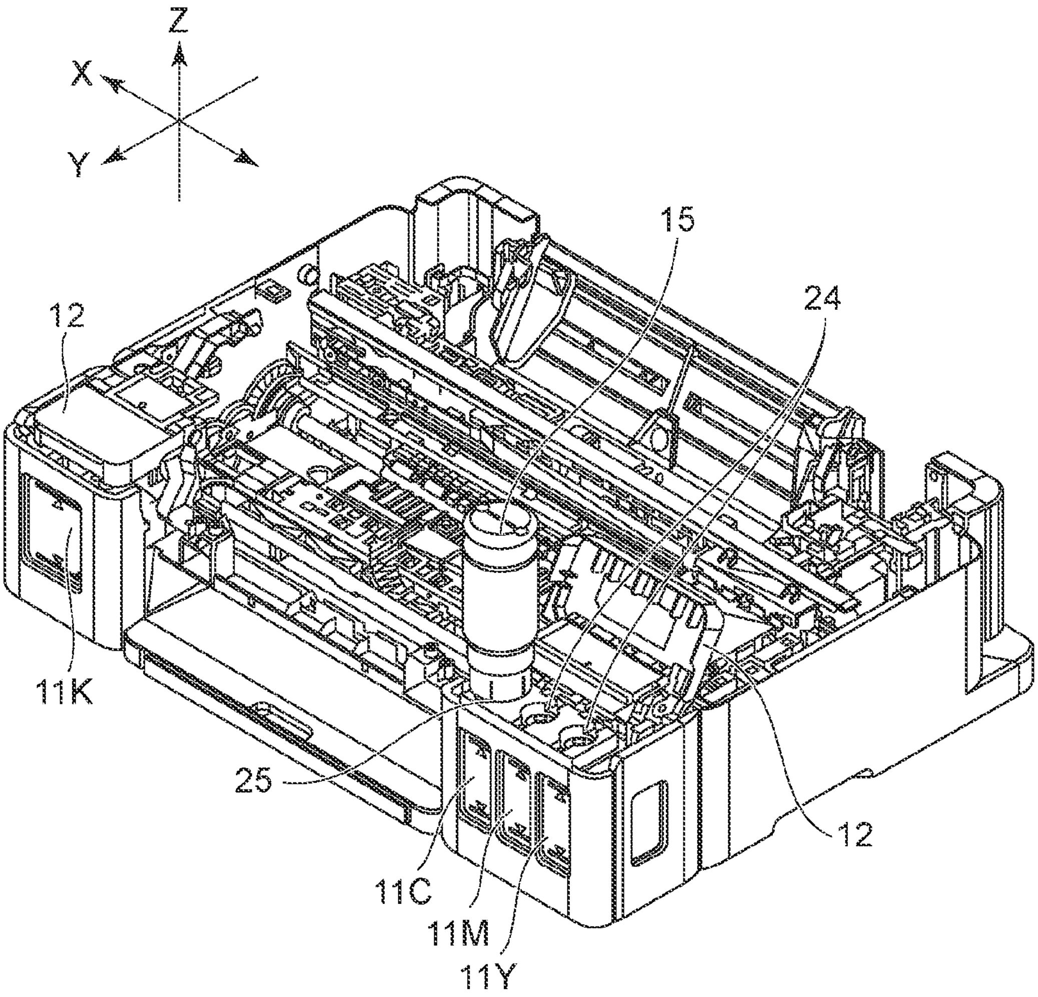
FIG. 6 is a perspective view for explanation of user's operation to inject ink for the ink jet printing apparatus according to the first embodiment.

FIG. 6 is a perspective view of the printing apparatus, illustrating a state in which a user injects ink. In the present embodiment, a mechanical identification groove 24 is formed in the vicinity of the injection port 14 of each ink tank 11 (at a position around the injection port 14 in the present embodiment). The mechanical identification groove 24 serves as a first shape portion. The mechanical identification groove 24 is a recess of which the shape is specific to each ink. The mechanical identification groove 24 is formed of a member different from that of the ink tank 11. Although not illustrated in FIG. 6, a mechanical identification groove 24 is also formed in the vicinity of the injection port 14 of the ink tank 11K for black (at a position around the injection port 14 in the present embodiment). In addition, a mechanical identification shape portion 25, of which the shape is specific to each ink, is formed in the vicinity of the outlet port 15*a* of the ink bottle 15 (at a position near the outlet port 15*a* in the present embodiment). The mechanical identification shape portion 25 serves as a second shape portion. The mechanical identification shape portion 25 is a protrusion formed integrally with the outlet port 15*a*.

The mechanical identification shape portion 25 and the mechanical identification groove 24 are configured to engage each other only when the ink bottle 15 containing the same ink as that stored in the ink tank 11 is inserted into the injection port 14. Moreover, the needle 22 can be inserted into the outlet port 15*a* only when the mechanical identification shape portion 25 engages the mechanical identification groove 24.

Accordingly, even if a user tries to insert an ink bottle 15 containing an ink different from that stored in the ink tank 11, the mechanical identification shape portion 25 does not engage the mechanical identification groove 24, and accordingly the needle 22 cannot enter the outlet port 15*a*. Thus, providing the ink tank 11 with the mechanical identification groove 24 and providing the ink bottle 15 with the mechanical identification shape portion 25 reduce the likelihood of a user injecting a wrong ink by mistake.

For example, the mechanical identification shape portion 25 of the ink bottle 15 containing magenta ink engages the mechanical identification groove 24 of the ink tank 11M for magenta, which enables a user to insert the ink bottle 15 into the injection port 14. On the other hand, the mechanical identification shape portion 25 of the ink bottle 15 containing cyan ink does not engage the mechanical identification groove 24 of the ink tank 11M for magenta, which prevents the user from inserting the ink bottle 15 into the injection port 14.

Figure 7A:
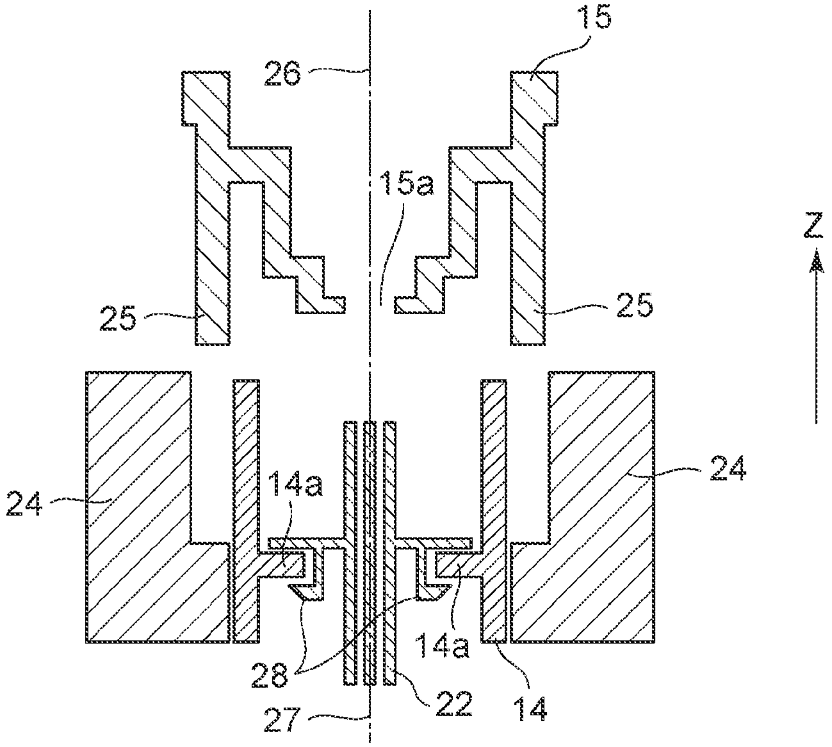
FIG. 7A and FIG. 7B are enlarged cross-sectional views for explanation of detailed configurations of a mechanical identification groove and a mechanical identification shape portion according to the first embodiment.
Figure 7B:
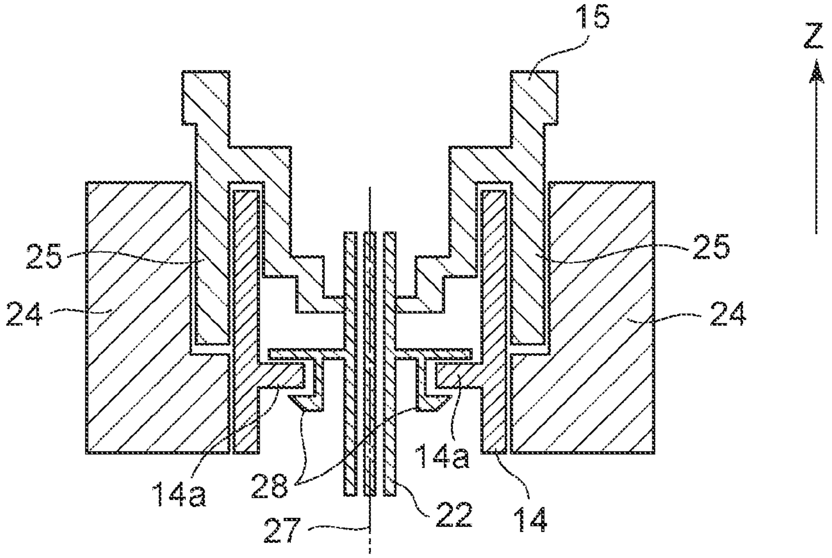

Detailed configurations of the mechanical identification groove 24 and the mechanical identification shape portion 25 will be described with reference to FIG. 7A and FIG. 7B. FIG. 7A is an enlarged cross-sectional view schematically illustrating a state before an ink bottle is inserted into an ink tank. FIG. 7B is an enlarged cross-sectional view schematically illustrating a state in which the ink bottle is inserted in the ink tank.

The mechanical identification groove 24 is formed so as to have a smaller cross section at a deeper side (downstream side) in the insertion direction of the ink bottle 15 (in the −Z direction). Accordingly, when the mechanical identification shape portion 25 engages the mechanical identification groove 24, the mechanical identification shape portion 25 is positioned stationarily with respect to the mechanical identification groove 24. A user can inject ink reliably due to the ink bottle 15 being stationary with respect to the ink tank 11. Moreover, the user does not necessarily hold the ink bottle 15 during ink injection, which leads to an improvement in ink injection work.

As illustrated in FIG. 7B, when the mechanical identification shape portion 25 of the ink bottle 15 engages the mechanical identification groove 24 of the ink tank 11, the needle 22 of the ink tank 11 is in the state of being inserted in the outlet port 15*a* of the ink bottle 15. Insertion of the needle 22 causes a valve (not illustrated) to open so that the inside of the ink bottle 15 can communicate with the inside the ink tank 11.

Figure 10A:
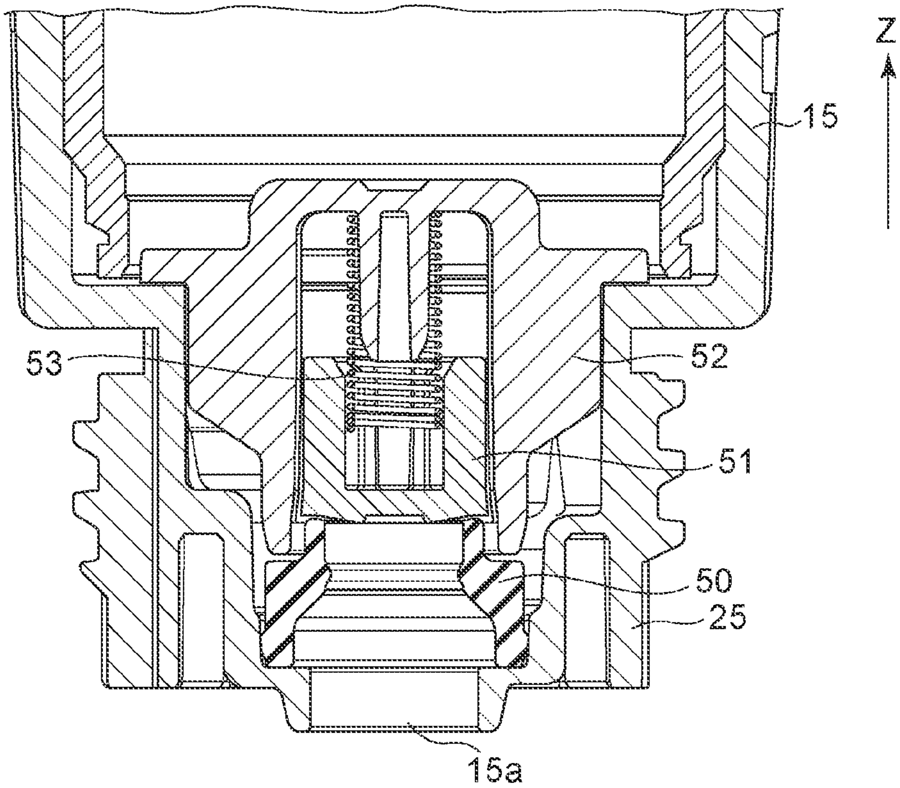
FIG. 10A and FIG. 10B are enlarged cross-sectional views illustrating a configuration example of a valve inside the ink bottle.
Figure 10B:
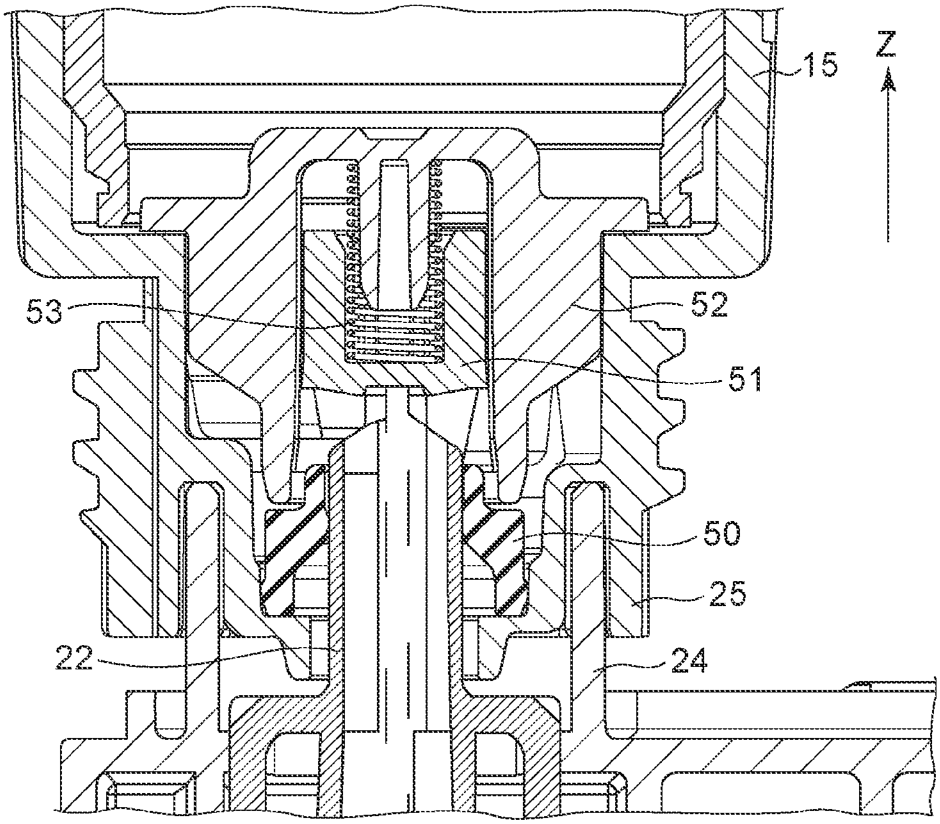

Here, an example of an openable and closable valve disposed inside the ink tank 11 is described with reference to FIGS. 10A and 10B. FIG. 10A is an enlarged cross-sectional view illustrating the outlet port 15*a* of an ink bottle 15 not inserted in a corresponding ink tank 11. FIG. 10B is an enlarged cross-sectional view illustrating the outlet port 15*a* of the ink bottle 15 inserted in the corresponding ink tank 11.

The ink bottle 15 has an elastic member 50, a displaceable member 51, a fixing member 52, and an urging member 53 that are disposed inside the outlet port 15*a*. The elastic member 50 is made, for example, of a rubber and disposed near the outlet port 15*a*. The elastic member 50 has a through hole having a diameter slightly smaller than the outer diameter of the needle 22 so that the needle 22 can penetrate the through hole. When the needle 22 is inserted into the outlet port 15*a*, the needle 22 engages the through hole of the elastic member 50 as illustrated in FIG. 10B. There is no gap formed between the needle 22 and the elastic member 50, and ink is thereby prevented from flowing therebetween. As a result, the first channel 22*a* and the second channel 22*b* of the needle 22 function appropriately as channels for ink and air.

The displaceable member 51 and the fixing member 52 are disposed at positions deeper inside the ink tank 11 with respect to the elastic member 50. An end of the urging member 53, such as a spring, is attached to the displaceable member 51, thereby urging the displaceable member 51 toward the elastic member 50. In other words, in the state of the ink bottle 15 being not inserted in the ink tank 11, the displaceable member 51 abuts the elastic member 50 to serve as a valve as illustrated in FIG. 10A. Accordingly, ink does not spill out of the outlet port 15*a* even if the outlet port 15*a* of the ink bottle 15 faces downward in the gravity direction.

The fixing member 52 is disposed around the displaceable member 51, and the other end of the urging member 53 is attached to the fixing member 52. The displaceable member 51 is displaceable with respect to the fixing member 52.

When a user inserts the ink bottle 15 into the ink tank 11, the needle 22 abuts the displaceable member 51. As illustrated in FIG. 10B, when the user inserts the ink bottle 15 deeper into the ink tank 11, the displaceable member 51 is moved toward the inside of the ink bottle 15 against the urging force of the urging member 53. This separates the displaceable member 51 from the elastic member 50 and enables the inside of the ink bottle 15 to communicate with the inside of the ink tank 11.

In the example illustrated in FIGS. 10A and 10B, the valve is closed due to the displaceable member 51 abutting the elastic member 50, and the valve is open due to the displaceable member 51 being separated from the elastic member 50. Note that the valve inside the ink tank 11 is not limited to this example. A rubber stopper with rubber elasticity or a slit valve or the like may be used.

Refer back to FIGS. 7A and 7B. The needle 22 has snap-fit portions 28 formed thereon, and the snap-fit portions 28 are joined to a protrusion 14*a* formed inside the injection port 14 of the ink tank 11. The needle 22 thereby becomes stationary relative to the ink tank 11 in the Z direction (i.e., in the direction of inserting the ink bottle 15 into the injection port 14). Accordingly, if a user pulls the needle 22 in the Z direction, the needle 22 does not come out.

On the other hand, the needle 22 is not stationary relative to the ink tank 11 and is displaceable in the X and Y directions. In other words, the needle 22 is configured such that the central axis 27 of the needle 22 can be inclined so as to align the central axis 26 of the ink bottle 15 inserted by a user.

Figures 8A, 8B, 8C:
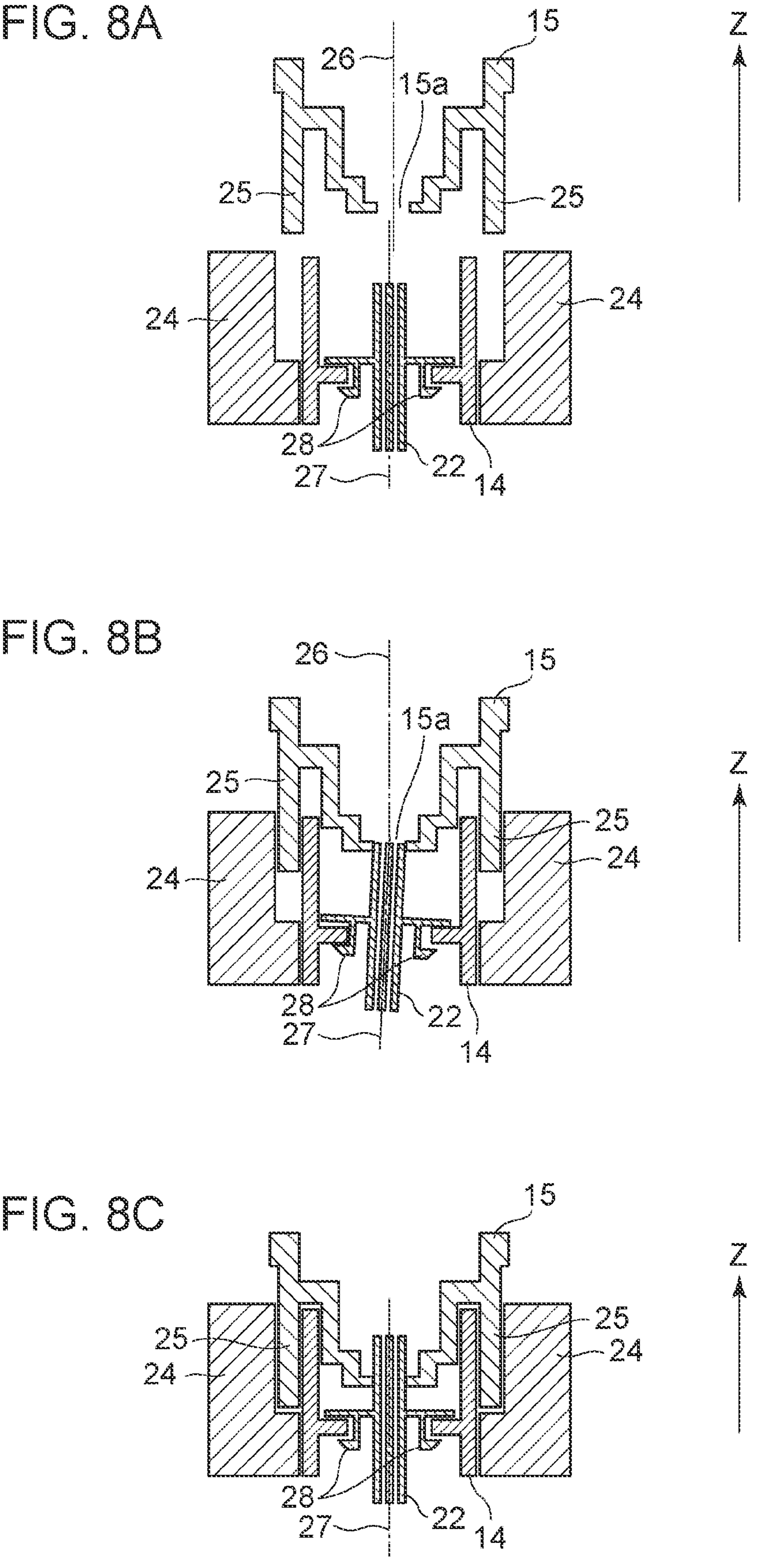
FIG. 8A to FIG. 8C are enlarged cross-sectional views schematically illustrating states in which a needle according to the first embodiment is equalized with an outlet port of an ink bottle.

FIG. 8A to FIG. 8C are enlarged cross-sectional views schematically illustrating states in which the needle is equalized in the X and Y directions so as to enable the ink bottle to engage the ink tank. FIGS. 8A to 8C illustrate states in which the ink bottle 15 is gradually inserted into the injection port 14 of the ink tank 11.

In FIG. 8A, the central axis 27 of the needle 22 is not aligned with the central axis 26 of the ink bottle 15. If a user further inserts the ink bottle 15 into the injection port 14 in this state, the mechanical identification shape portion 25 may engage the mechanical identification groove 24, but the needle 22 is not inserted appropriately into the outlet port 15*a*.

In the present embodiment, the needle 22 can be displaced in the X and Y directions. With this configuration, when the tip of the needle 22 abuts the outlet port 15*a*, the central axis 27 of the needle 22 is caused to incline (see FIG. 8B). This equalizing mechanism (alignment mechanism or centering mechanism) of the needle 22 enables the needle 22 to be inserted appropriately into the outlet port 15*a* (see FIG. 8C). In other words, the central axis 27 of the needle 22 is aligned with the central axis 26 of the outlet port 15*a*.

As described above, the ink bottle 15 is positioned stationarily with respect to the ink tank 11 using the mechanical identification shape portion 25 and the mechanical identification groove 24. This enables a user to inject ink reliably into the ink tank 11.

The needle 22 is configured to move in the X and Y directions and can be equalizedly inserted into the outlet port 15*a* of the ink bottle 15. This enables the needle 22 and the outlet port 15*a* to be aligned appropriately with each other, which reduces the likelihood of the user performing a wrong operation that may cause, for example, the needle 22 to break the ink bottle 15.

In the above description, the engagement of the identification shape portion 25 and the identification groove 24 is achieved using the protrusion of the mechanical identification shape portion 25 and the recess of the mechanical identification groove 24. However, the present invention is not limited to this. The recess may be formed in the ink bottle 15, and the protrusion may be formed in the ink tank 11. Moreover, it has been described that the ink bottle 15 is fixed onto the ink tank 11 by the engagement of the mechanical identification shape portion and the mechanical identification groove. However, the fixation of the ink bottle 15 to the ink tank 11 may be achieved using an engagement shape that does not form a mechanical identification specific to a type of ink.

Second Embodiment

Figure 9:
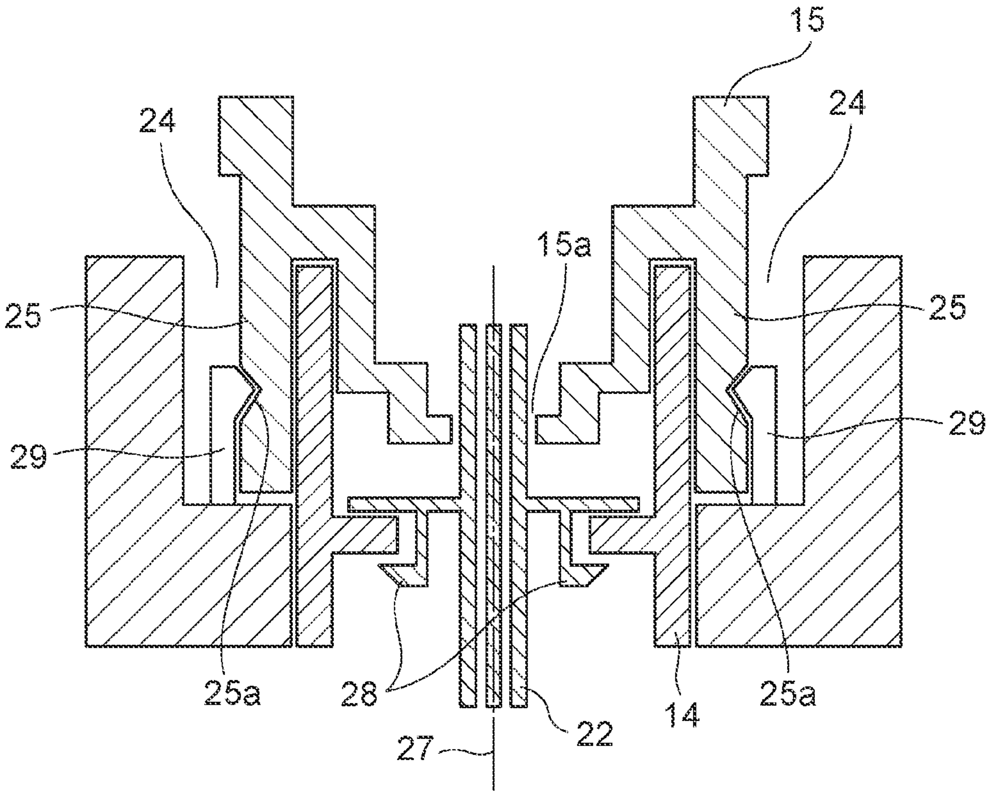
FIG. 9 is an enlarged cross-sectional view for explanation of detailed configurations of a mechanical identification groove and a mechanical identification shape portion according to a second embodiment.

A second embodiment of the present disclosure will be described with reference to FIG. 9. FIG. 9 is an enlarged cross-sectional view schematically illustrating a state of engagement between an ink bottle 15 and a corresponding ink tank 11 according to the second embodiment. In the second embodiment, pressing members 29 having a snap-fit configuration are disposed inside the mechanical identification groove 24 of the ink tank 11. In addition, recesses 25*a* are formed in the mechanical identification shape portion 25 of the ink bottle 15 so as to oppose respective pressing members 29 when the mechanical identification shape portion 25 engages the mechanical identification groove 24.

When the ink bottle 15 engages the ink tank 11 appropriately, a user can feel clicking produced by engagement of the pressing members 29 with the recesses 25*a*. This enables the user to confirm the ink bottle 15 is securely mounted in the injection port 14, which can reduce the likelihood of the user inserting (mounting) the ink bottle 15 wrongly.

Moreover, the engagement of the pressing members 29 with the recesses 25*a* enhances secure fixing of the ink bottle 15 onto the ink tank 11, which can achieve more reliable ink injection. Thus, ink can be injected reliably also with the configuration of the present embodiment.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A liquid ejecting apparatus, comprising:

a tank including: a chamber that stores liquid to be supplied to a printhead configured to eject the liquid; and an injection port through which the liquid is injected into the chamber;

a flow channel member which is a separate member from the tank; is configured to be disposed inside the injection port; includes a channel through which the liquid is injected into the chamber from a liquid container which is inserted into the injection port for supplying the liquid in the liquid container to the tank; and is configured to be able to move relative to the injection port in a direction intersecting an opening direction of the injection port according to movement of the liquid container when the liquid container is inserted into the injection port; and a first shape portion which is a separate portion from the flow channel member, and is configured to be engaged with a second shape portion in the liquid container, wherein the tank includes a support portion provided inside the injection port, configured to support the flow channel member, and defining a hole through which the liquid can pass the support portion.

2. The liquid ejecting apparatus according to claim 1, wherein the first shape portion forms a recess, and the second shape portion forms a protrusion.

3. The liquid ejecting apparatus according to claim 2, wherein the first shape portion includes a first cross section at a downstream side in an insertion direction of inserting an outlet port of the liquid container into the injection port and a second cross section, at an upstream side in the insertion direction, which is larger than the cross section at the downstream side.

4. The liquid ejecting apparatus according to claim 1, wherein the printhead is capable of ejecting a first liquid and a second liquid different from the first liquid, the first shape portion of a tank storing the first liquid engages the second shape portion of the liquid container storing the first liquid, and the first shape portion of a tank storing the second liquid does not engage the second shape portion of the liquid container storing the first liquid.

5. The liquid ejecting apparatus according to claim 4, further comprising a discharge unit configured to discharge a print medium, wherein the discharge unit is arranged between the tank storing the first liquid and the tank storing the second liquid.

6. The liquid ejecting apparatus according to claim 1, wherein the liquid container includes an outlet port, and an openable and closable valve disposed inside the outlet port, the valve is configured to open to inject the liquid by the flow channel member when the first shape portion engages the second shape portion, and the valve is configured not to open and the liquid is not able to be injected when the first shape portion does not engage the second shape portion.

7. The liquid ejecting apparatus according to claim 6, wherein the valve includes:

an elastic member disposed near the outlet port and including a hole through which the flow channel member is capable of passing; and a displaceable member urged by an urging member toward the elastic member, and the valve is configured to close when the displaceable member abuts the elastic member.

8. The liquid ejecting apparatus according to claim 7, wherein when the outlet port is inserted into the injection port and the flow channel member separates the displaceable member from the elastic member against an urging force of the urging member, the valve opens.

9. The liquid ejecting apparatus according to claim 7, wherein an inner diameter of the through hole is smaller than an outer diameter of the flow channel member.

10. The liquid ejecting apparatus according to claim 1, wherein the flow channel member includes:

a first channel through which the liquid flows from the liquid container to the chamber; and a second channel through which air flows from the chamber to the liquid container.

11. The liquid ejecting apparatus according to claim 1, wherein the tank includes a pressing member with a snap-fit configuration disposed inside the first shape portion, and the liquid container includes a recess that engages the pressing member in the state of the first shape portion and the second shape portion engaging each other.

12. The liquid ejecting apparatus according to claim 1, wherein the tank is fixed to a main body of the liquid ejecting apparatus.

13. The liquid ejecting apparatus according to claim 1, comprising a cap configured to cap the injection port.

14. The liquid ejecting apparatus according to claim 1, wherein the engagement between the second shape portion and the first shape portion enables the liquid container to stand by itself.

15. The liquid ejecting apparatus according to claim 1, wherein the flow channel member has a cylindrical shape extending in the opening direction, a flange portion is provided on a middle portion of the flow channel member, the injection port has a cylindrical shape having a first diameter larger than a second diameter of the flow channel member, a protrusion is formed inside the injection port so as to form an opening through which the flow channel member passes, the opening has a third diameter larger than the second diameter, and the flange portion is placed on the protrusion portion.

16. The liquid ejecting apparatus according to claim 1, wherein the liquid container is fixed to the tank by engagement between the first shape portion and the second shape portion.

17. The liquid container according to claim 1, wherein the first shape portion overlaps with the second shape portion in the opening direction of the injection port in a state in which the first shape portion is engaged with the second shape portion.

18. The liquid ejecting apparatus according to claim 1, wherein first shape portion is engaged with the second shape portion in an up and down direction when the liquid container is inserted into the injection port.

* * * * *